(12) United States Patent
Kerr

(10) Patent No.: US 9,167,907 B2
(45) Date of Patent: Oct. 27, 2015

(54) TIERED INLINE LOVESEAT AND METHOD OF USE THEREOF

(71) Applicant: Walter B. Kerr, Blairsville, GA (US)

(72) Inventor: Walter B. Kerr, Blairsville, GA (US)

( * ) Notice: Subject to any disclaimer, the term of this patent is extended or adjusted under 35 U.S.C. 154(b) by 0 days.

(21) Appl. No.: 14/219,081

(22) Filed: Mar. 19, 2014

(65) Prior Publication Data
US 2015/0265060 A1  Sep. 24, 2015

(51) Int. Cl.
*A47C 15/00* (2006.01)
*A47C 3/00* (2006.01)
*A47C 3/04* (2006.01)
*B64D 11/06* (2006.01)
*A47C 1/124* (2006.01)

(52) U.S. Cl.
CPC .............. *A47C 15/004* (2013.01); *A47C 3/00* (2013.01); *A47C 1/124* (2013.01); *A47C 3/04* (2013.01); *B64D 11/0601* (2014.12)

(58) Field of Classification Search
CPC .... B64D 11/0601; A47C 1/12; A47C 15/004; A47C 3/04; A47C 1/124
USPC ................ 297/243, 253, 254, 232, 239, 242, 297/423.19, 423.25, 423.27, 423.3, 423.4, 297/423.46; 52/8
See application file for complete search history.

(56) References Cited

U.S. PATENT DOCUMENTS

| | | | |
|---|---|---|---|
| 2,495,374 A * | 1/1950 | Horn ................................ 4/476 |
| 2,532,812 A * | 12/1950 | Huber ........................... 297/149 |
| 4,095,820 A * | 6/1978 | Hanagan ....................... 224/275 |
| 4,225,183 A * | 9/1980 | Hanagan et al. .......... 297/411.31 |
| 4,804,221 A * | 2/1989 | Saiki ........................... 297/284.9 |
| 4,874,203 A * | 10/1989 | Henley ....................... 297/250.1 |
| 5,118,163 A * | 6/1992 | Brittian et al. ............. 297/250.1 |
| 5,474,356 A * | 12/1995 | Johnson ....................... 297/156 |
| 6,840,583 B1 | 1/2005 | Turner et al. |
| 7,100,877 B2 | 9/2006 | Bourke et al. |
| 2009/0272042 A1 | 11/2009 | Brunner |

* cited by examiner

*Primary Examiner* — Chi Q Nguyen
(74) *Attorney, Agent, or Firm* — Mathew L. Grell; Balser & Grell IP Law

(57) ABSTRACT

A tiered inline loveseat includes a first chair and a second chair where the second chair is positioned inline and below the first chair. The first chair includes a first seat, and a first seat back. The first seat has a front end, a back end, a first side and a second side. The first seat back is coupled to the back end of the first seat. The second chair has a second seat and a second seat back with a bottom edge and a top edge. Wherein, the top edge of the second seat back is coupled to the front end of the first seat.

13 Claims, 14 Drawing Sheets

TIERED INLINE LOVESEAT AND METHOD OF USE THEREOF

CROSS-REFERENCE TO RELATED APPLICATIONS

None

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field

The disclosure generally relates to furniture like home furniture, outdoor furniture, patio furniture, beach furniture, etc. More particularly, the instant disclosure relates to a tiered inline loveseat that seats two people inline with one another where one individual, typically the female, is positioned between the legs of the other individual, typically the male.

2. Description of Related Art

Loveseats have been in production since the early 1800s in the US. A loveseat is typically known as a couch or sofa designed for seating two persons, and it usually has two designated seats. In a typical loveseat, the seats are arranged so that the two individuals are positioned parallel to one another shoulder to shoulder.

It has been discovered that this parallel positioning of the two individuals on the loveseat is not very intimate and does not produce any heightened sensual sensations emotions, awareness, or feelings of sexual excitement or arousal. In addition, this parallel positioning requires a wide space which adds to the productions costs and limits the areas where the loveseat may be positioned.

Therefore, it is readily apparent that there is a recognizable unmet need for a tiered inline loveseat that is comfortable, easy to produce, compact, and provides a more intimate positioning of the two seated individuals.

SUMMARY

Briefly described, in a preferred embodiment, the present apparatus and method overcomes the above-mentioned disadvantages and meets the recognized need for such a device by providing a tiered inline loveseat capable of seating two people where one individual is positioned below and between the legs of the other individual. In a typical arrangement, the female may be positioned below and between the legs of the male thereby providing an intimate feeling between the male and female.

The present apparatus and method includes a tiered inline loveseat, wherein the tiered inline loveseat includes a first chair and a second chair where the second chair is positioned inline and below the first chair. The first chair includes a first seat, and a first seat back. The first seat has a front end, a back end, a first side and a second side. The first seat back is coupled to the back end of the first seat. The second chair has a second seat and a second seat back with a bottom edge and a top edge. Wherein, the top edge of the second seat back is coupled to the front end of the first seat.

One feature of the instant disclosure may be the ability to position two persons inline with one another where the first person is in the first chair and the second person is in the second chair.

Another feature may be the ability for the second person to be positioned in front of and below the first person.

Another feature may be the ability for the second person to be positioned between the legs of the first person.

Another feature may be the ability to be used where the legs of the first person function as arm rests for the second person.

Yet another feature may be the ability to be used where the torso of the first person functions as a seat back for the second person.

One feature may be the first chair having a first arm rest for the first side of the first seat and a second arm rest for the second side of the first seat.

One feature may be the first seat having a reduced depth to position the second user between the legs of the first user.

Another feature may be the first seat having a widened width to allow the first person to spread his legs wide enough to fit around the second person.

Another feature may be the second seat back having a reduced length to position the top portion of the second person's back between the legs of the first person.

Another feature may be the first seat chair being reclined from vertical at a first reclined angle, and the second chair being reclined from vertical at a second reclined angle, where the second reclined angle is greater than the first reclined angle.

Another feature may be the first seat back being positioned from the first seat at a first seat angle equal to or greater than 90 degrees, and the second seat back being positioned from the second seat at a second seat angle equal to or greater than 90 degrees.

One feature may be the first seat angle being adjustable.

Another feature may be the inline tiered loveseat being made of wood.

Another feature may be the inline tiered loveseat being made from tube framing with canvas seats and backs.

In use, a method of intimacy utilizing various embodiments of the tiered inline loveseat device is shown and described herein. The method of intimacy may include the steps of: providing any of the various tiered inline loveseats shown and described herein; and positioning two persons inline with one another where the first person is in the first chair and the second person is in the second chair.

One feature of the method may be that the step of positioning two persons inline with one another where the first person is in the first chair and the second person is in the second chair may further include: positioning a first person in the first chair; spreading the legs of the first person; positioning the second person in the second chair below and between the legs of the first person; resting the upper back of the second person against the torso of the first person; and using the first person's legs as arm rests for the second person.

Another feature of the method may be the additional steps of: looking down on the second person by the first person; and touching of the second person by the first person.

These and other features of the tiered inline loveseat and its method of use thereof will become more apparent to one skilled in the art from the prior Summary, and following Brief Description of the Drawings, Detailed Description, and Claims when read in light of the accompanying Detailed Drawings.

BRIEF DESCRIPTION OF THE DRAWINGS

The present tiered inline loveseat device will be better understood by reading the Detailed Description with reference to the accompanying drawings, which are not necessarily drawn to scale, and in which like reference numerals denote similar structure and refer to like elements throughout, and in which.

Figure 1:
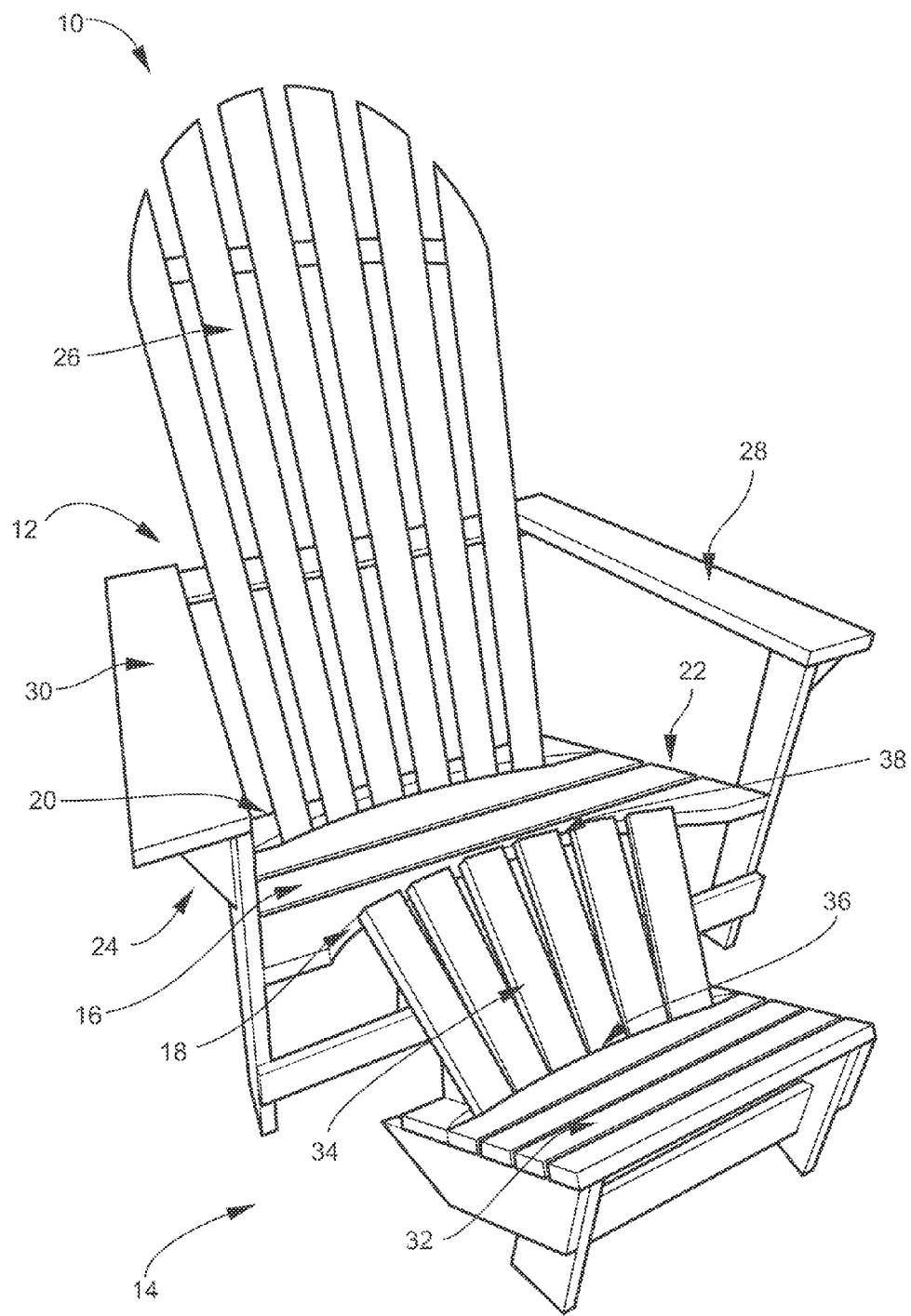
FIG. 1 is a perspective view of an exemplary wooden embodiment of the tiered inline loveseat.

It is to be noted that the drawings presented are intended solely for the purpose of illustration and that they are, therefore, neither desired nor intended to limit the disclosure to any or all of the exact details of construction shown, except insofar as they may be deemed essential to the claimed invention.

DETAILED DESCRIPTION

In describing the exemplary embodiments of the present disclosure, as illustrated in FIGS. 1-14, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Referring now to FIGS. 1-13 by way of example, and not limitation, therein is illustrated example embodiments of tiered inline loveseat 10 and 10b. The Figures of the tiered inline loveseat 10 and 10b show possible embodiments of the angles, the widths, the heights, the lengths, the assembly, and the parts of the chair whereby two people can sit together comfortably and intimately.

As shown therein, tiered inline loveseat 10 generally comprises first chair 12 and second chair 14 where second chair 14 may be positioned inline and below first chair 12. First chair 12 includes first seat 16, and first seat back 26. First seat 16 has front end 18, back end 20, first side 22 and second side 24. First seat back 26 may be coupled to back end 20 of first seat 16. Second chair 14 includes second seat 32 and second seat back 34, which has bottom edge 36 and top edge 38. Wherein, top edge 38 of second seat back 34 may be coupled to front end 18 of first seat 16.

Figure 2:
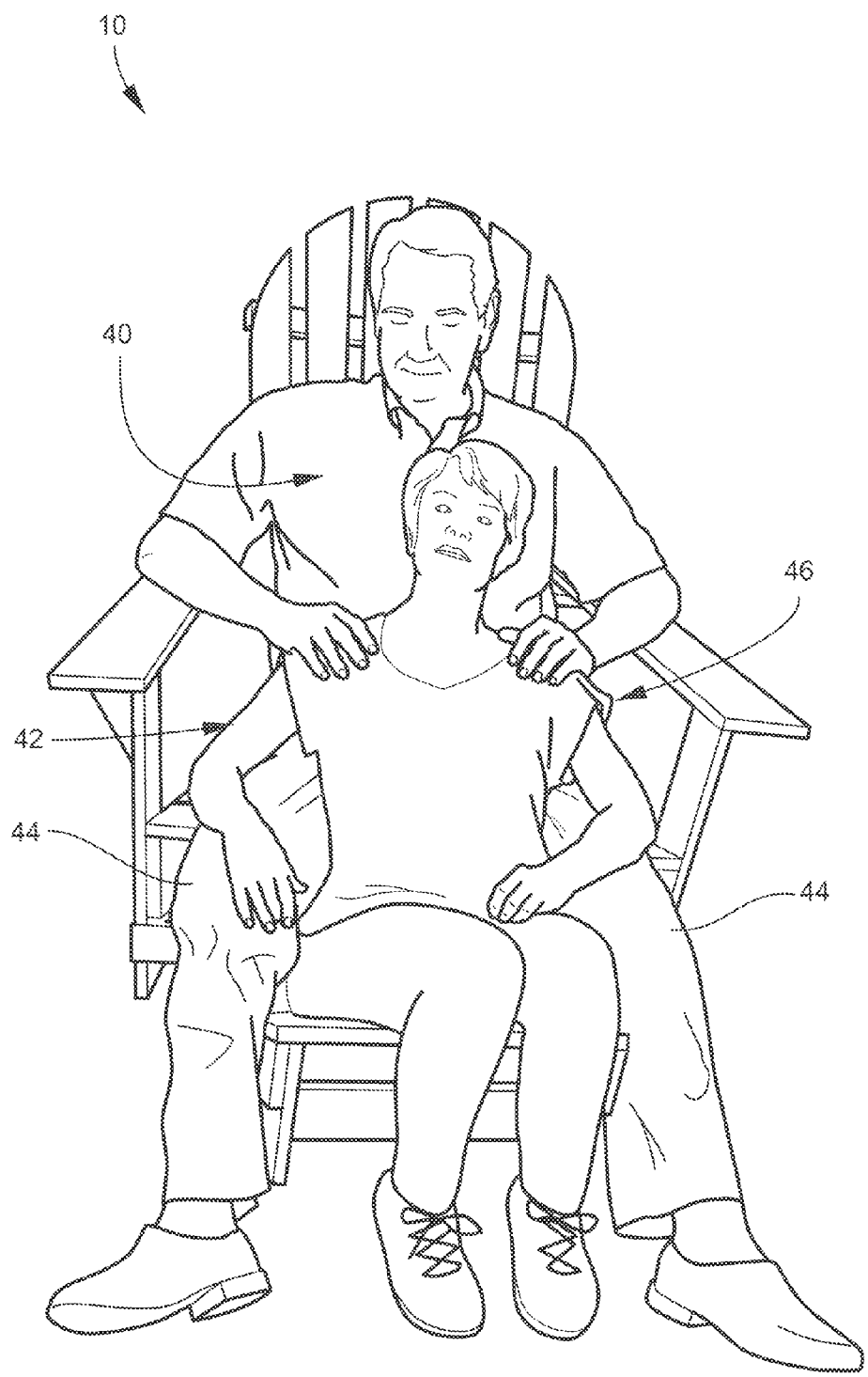
FIG. 2 is an environment perspective view of the embodiment of FIG. 1 with two individuals positioned in the tiered inline loveseat where one individual is positioned between the legs of the other individual.
Figure 3:
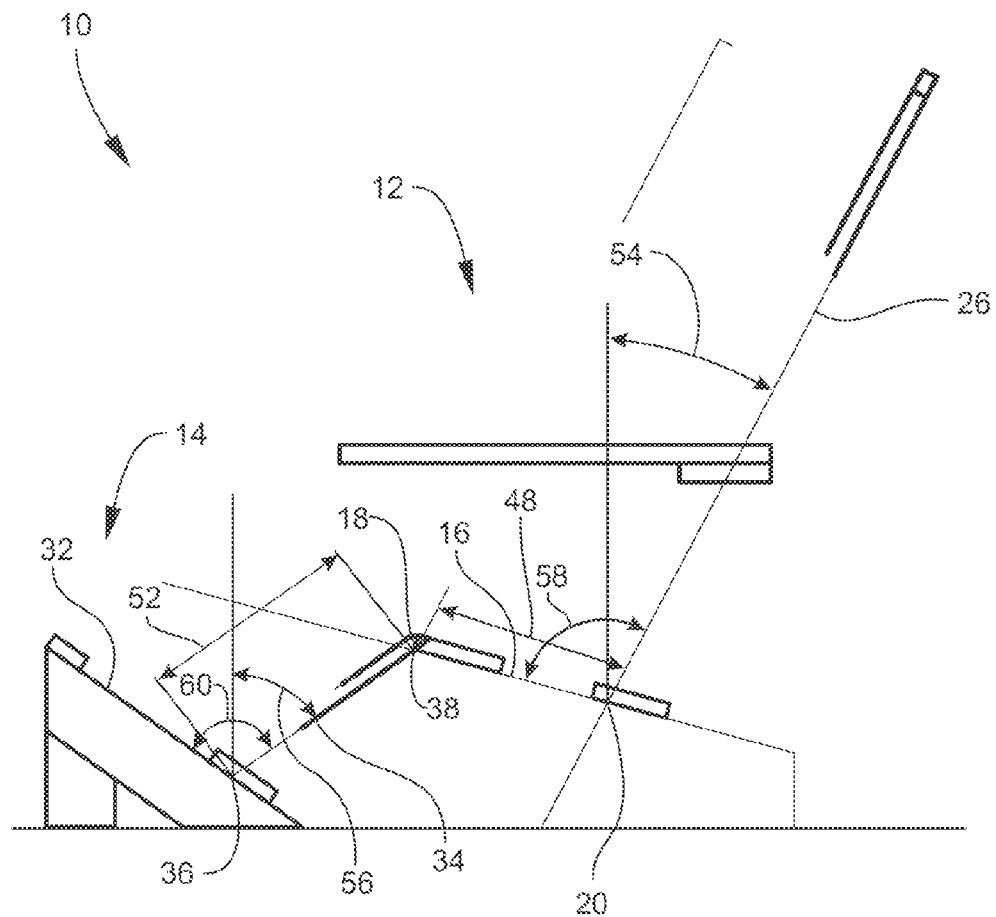
FIG. 3 is a diagram of the various angles of an exemplary embodiment of the tiered inline loveseat.
Figure 4:
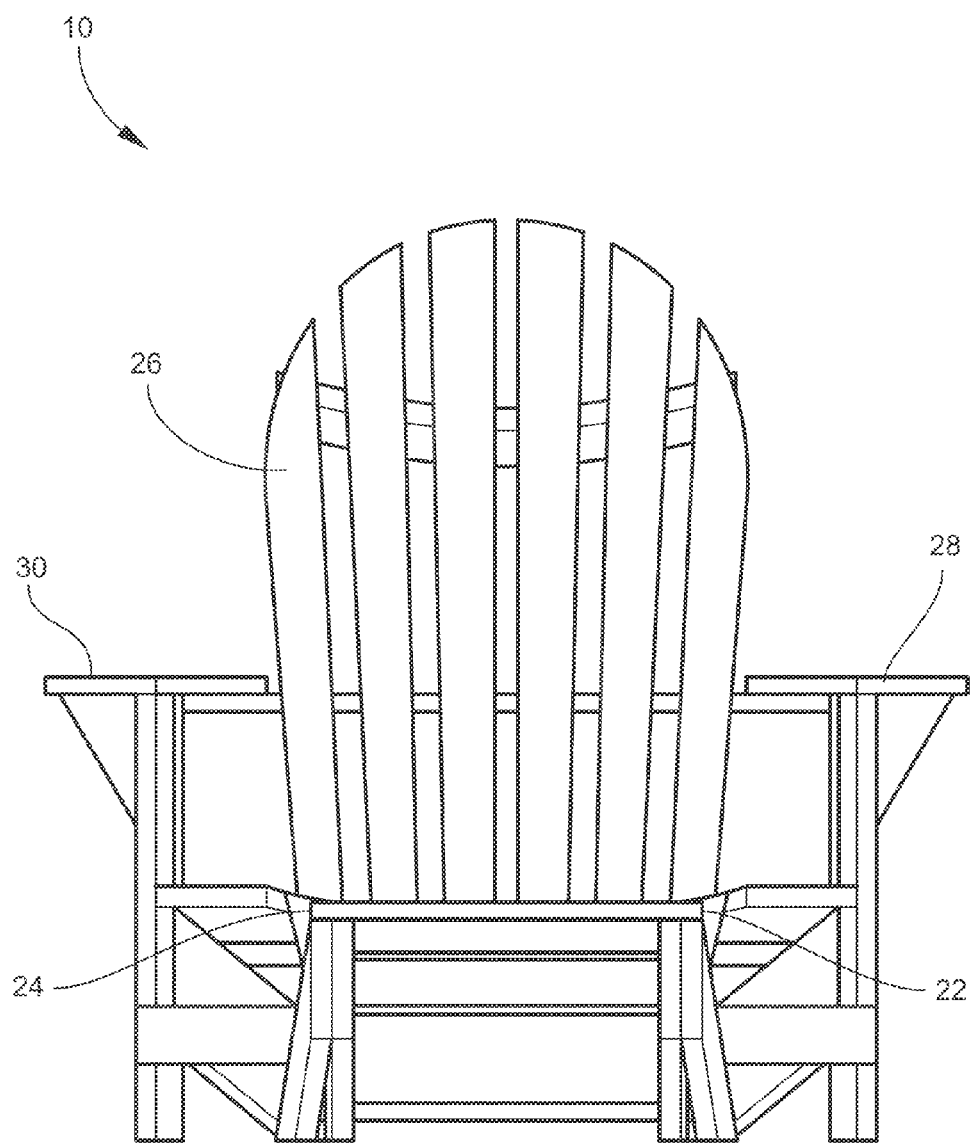
FIG. 4 is a front view of the embodiment of FIG. 1.
Figure 5:
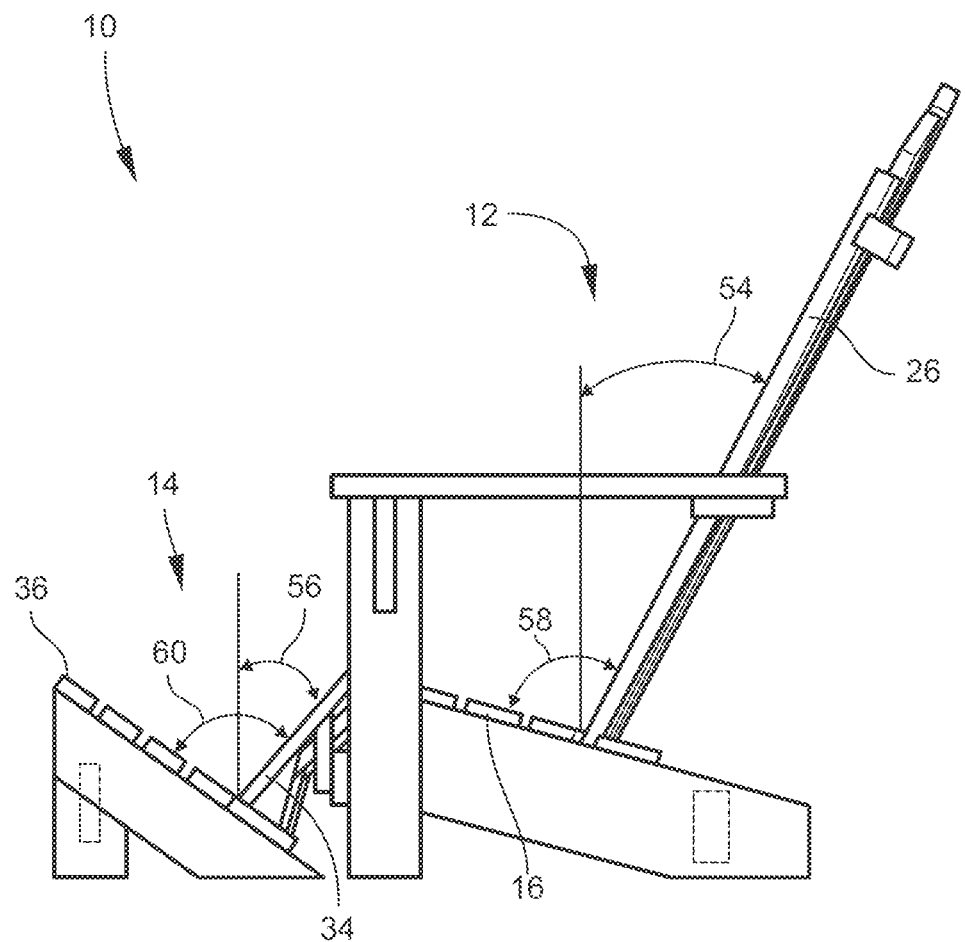
FIG. 5 is a side view of the embodiment of FIG. 1.
Figure 6:
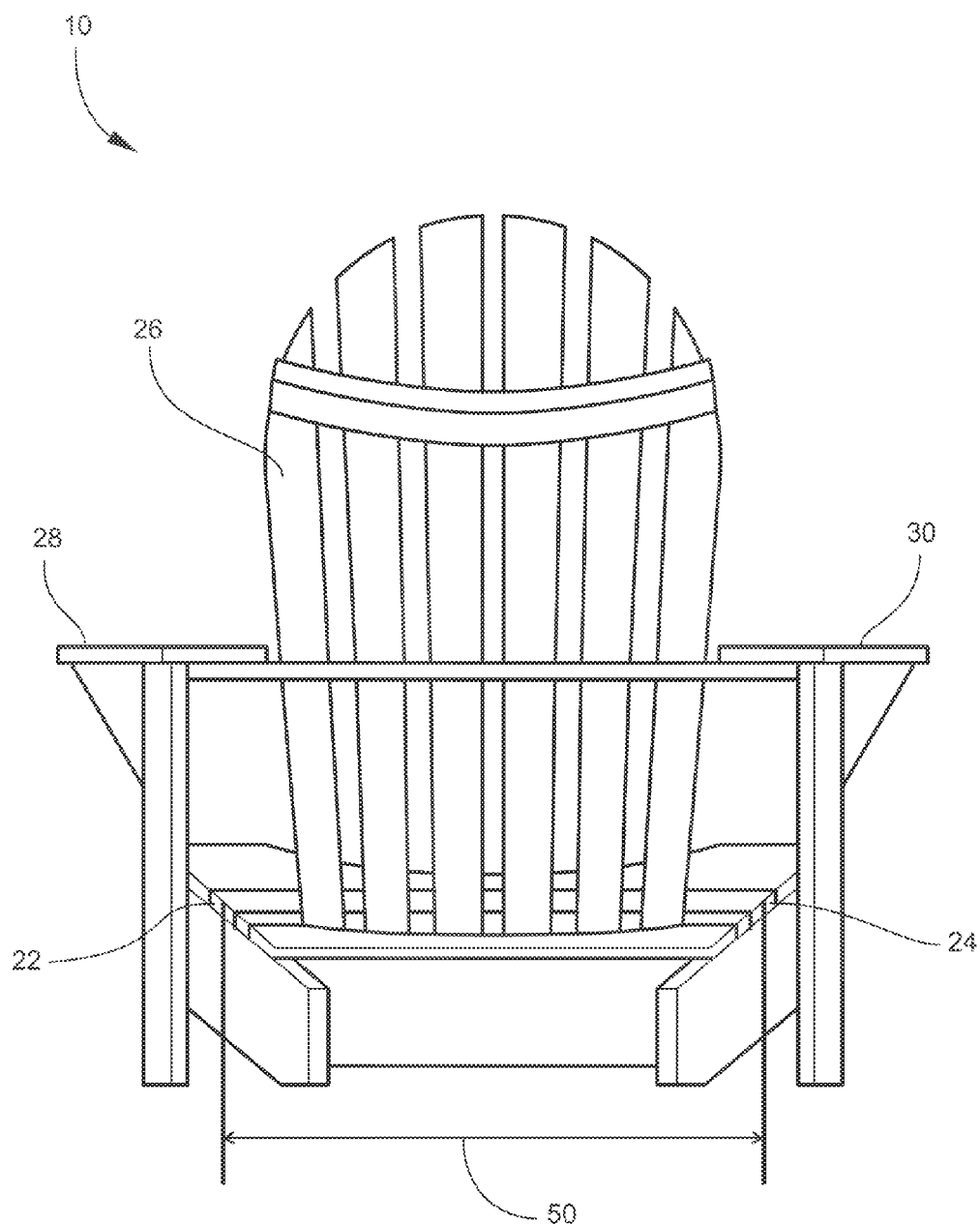
FIG. 6 is a back view of the embodiment of FIG. 1.
Figure 7:
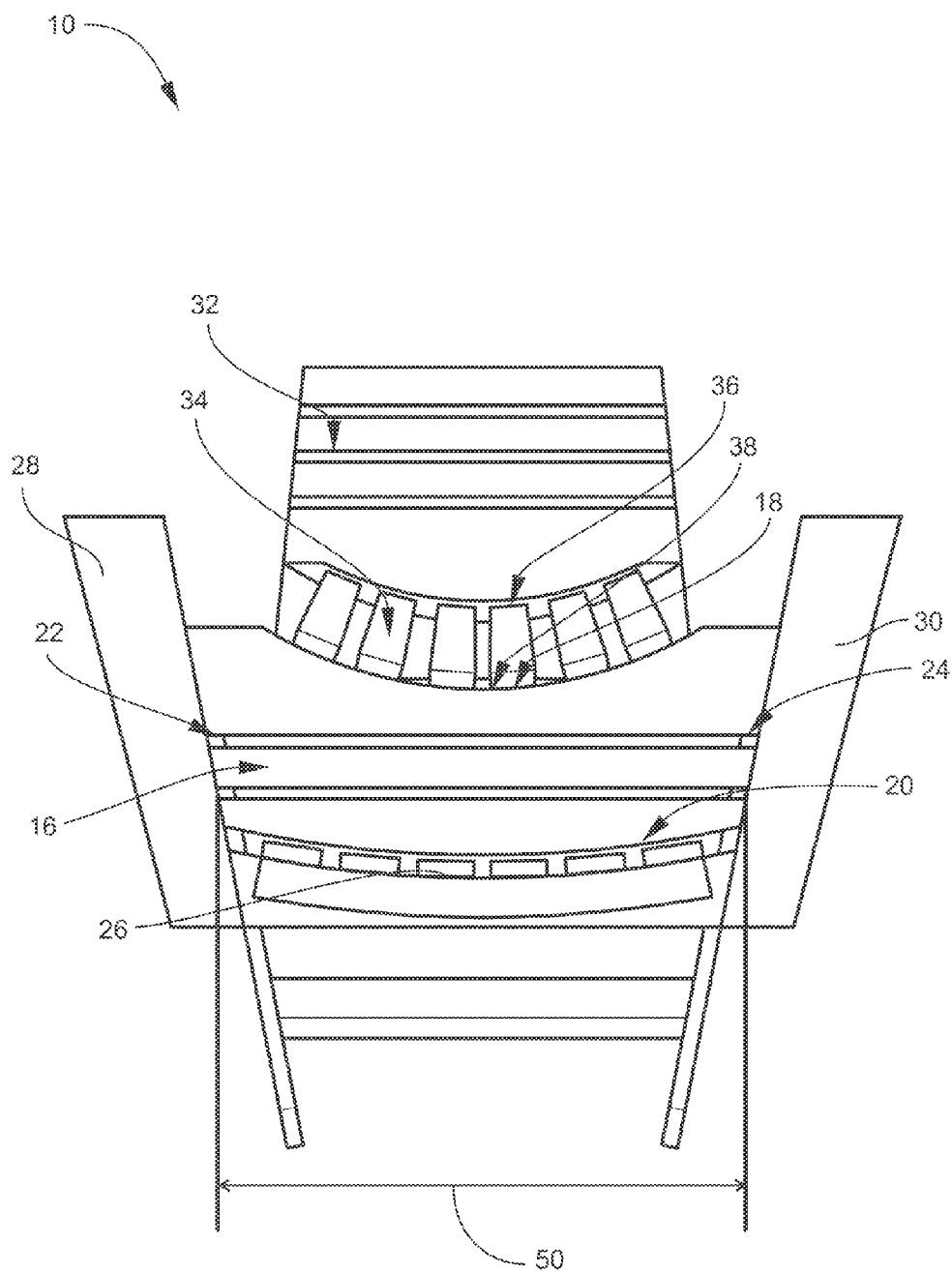
FIG. 7 is an auxiliary top view of the embodiment of FIG. 1.
Figure 8:
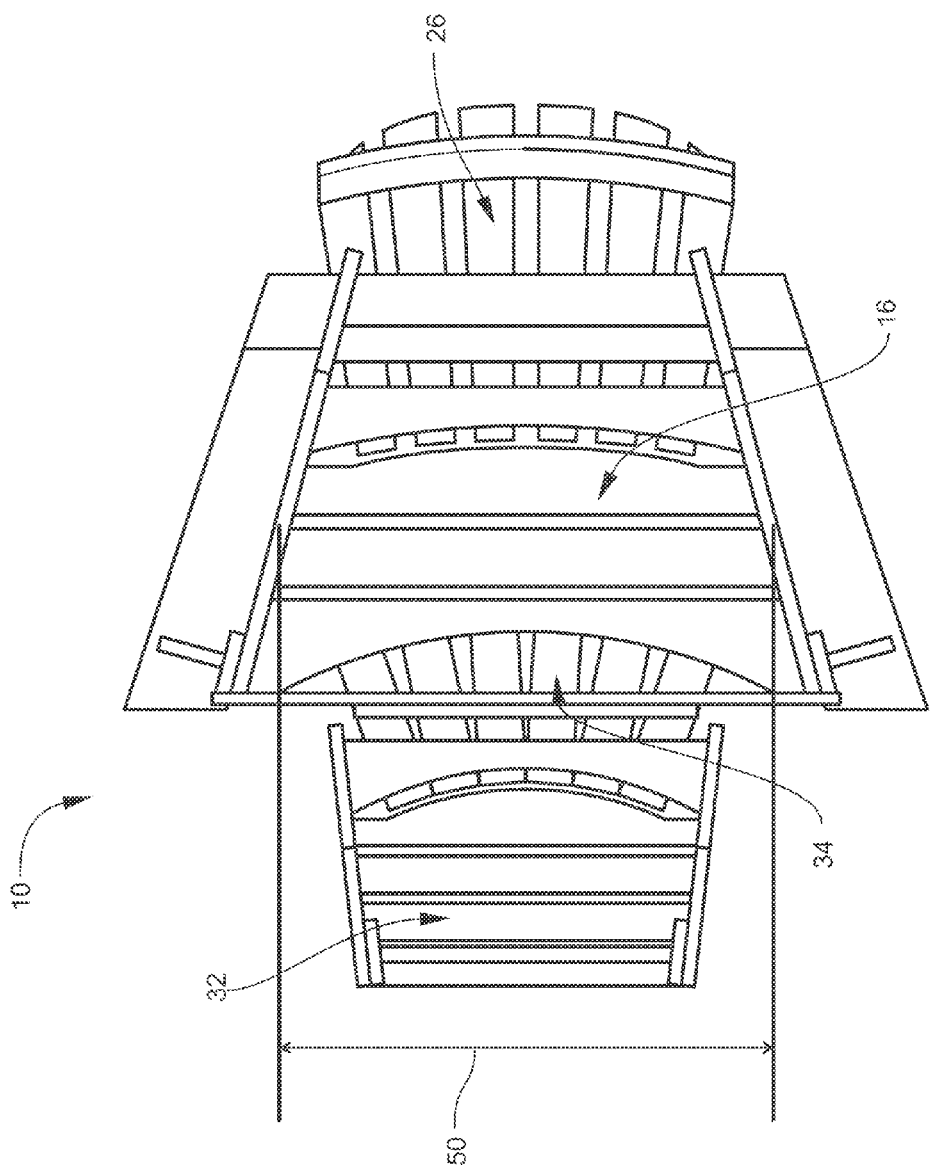
FIG. 8 is a bottom view of the embodiment of FIG. 1.
Figure 9:
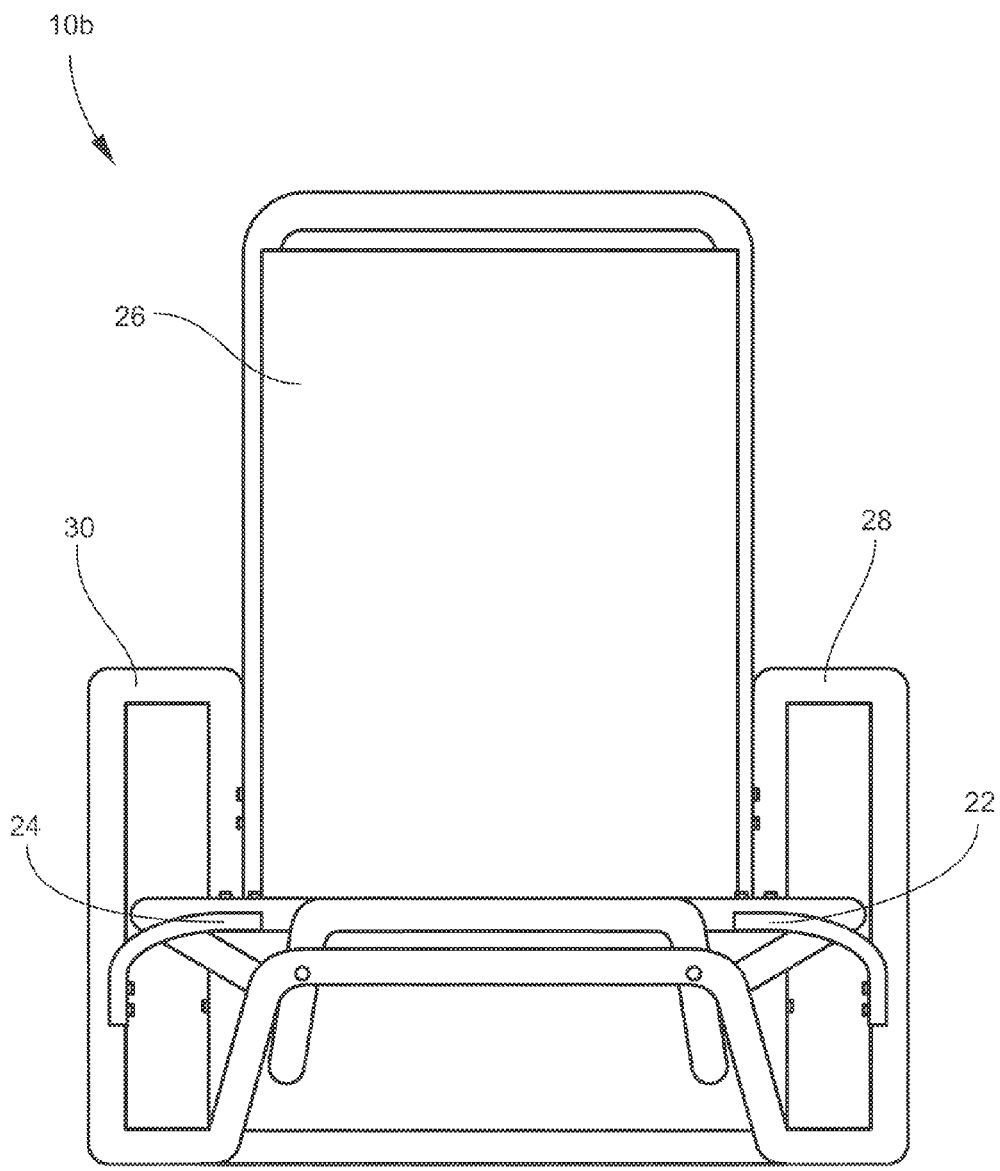
FIG. 9 is a front view of an exemplary tube and canvas embodiment of the tiered inline loveseat.

As shown in FIG. 2, tiered inline loveseat 10 may be designed to position two persons 40 and 42 inline with one another where first person 40 may be in first chair 12 and second person 42 may be in second chair 14. Tiered inline loveseat 10 may be used by first person 40 and second person 42 in various desired manners with any desired position of the two persons, alone or in combination. In one embodiment, tiered inline loveseat 10 may be used where second person 42 may be positioned in front of and below first person 40. In another embodiment, tiered inline loveseat 10 may be used where second person 42 may be between legs 44 of first person 40. In another embodiment, tiered inline loveseat 10 may be used where legs 44 of first person 40 may function as arm rests for second person 42. In yet another embodiment, tiered inline loveseat 10 may be used where torso 46 of first person 40 may function as a seat back for second person 42.

First arm rest 28 and second arm rest 30 may be included in select embodiments of tiered inline loveseat 10, as shown in FIGS. 1-13. First arm rest 28 and second arm rest 30 may optionally be included in tiered inline loveseat 10 for comfort of first person 40 and/or for aiding in sitting into and standing out of tiered inline loveseat 10 by both first person 40 and second person 42. First arm rest 28 may be for first side 22 of first seat 16 and second arm rest 30 may be for second side 24 of first seat 16. First arm rest 28 and second arm rest 30 may be attached or coupled to loveseat 10 in any desired fashion. As shown in the figures, in one embodiment first arm rest 28 may be coupled to first side 22 of first seat 16 and first seat back 26, and second arm rest 30 may be coupled to second side 24 of first seat 16 and first seat back 26.

Reduced depth 48 may be included in first seat 16. See FIG. 3. Reduced depth 48 may be provided in first seat 16 to position second person 42 between the legs 44 of first person 40. Reduced depth 48 may be any depth or size adapted to position second person 42 between the legs 44 of first person 40. Reduced depth 48 may vary depending on the size of first person 40 and/or second person 42. Reduced depth 48 may be deep enough for first person 40 to be comfortable, while at the same time not be of a depth that the back of second person 42 would encounter the front end 18 of first chair 12 and cause pain to second person 42. In one embodiment, reduced depth 48 may be less than 20 inches. In another embodiment, reduced depth 48 may be between 5 and 15 inches. In yet another embodiment, reduced depth 48 may be approximately 11 inches. As shown in FIGS. 1 and 4-8, in select embodiments reduced depth 48 may include a cutout or curved section at the front end 18 of first seat 16 for receiving top edge 38 of second seat back 34. In one embodiment, front end 18 may be arced or curved to enable second seat back 34 affixed thereto to be arced or curved to aid in comfort and stability of seat back 34 for second person 42.

Widened width 50 may be included in first seat 16. See FIGS. 6-8, 12 and 13. Widened width 50 may be to allow first person 40 to spread his legs 44 wide enough to fit around second person 42. Widened width 50 may be any size width for allowing first person 40 to spread his legs 44 wide enough to fit around second person 42. Widened width 50 may vary depending on the size of first person 40 and/or second person 42. Widened width 50 may include an angle or increased width in first seat 16 from back end 20 to front end 18. Widened width 50 may also include widened width or larger distance from first side 22 to second side 24 of first seat 16. In one embodiment, widened width 50 may have a mean greater than 15 inches. In another embodiment, widened width 50 may have a mean of between 20 and 40 inches. In yet another embodiment, widened width 50 may have a mean of approximately 29 inches.

Widened width between first arm rest 28 and second arm rest 30 may be to allow first person 40 to spread his legs wide enough to fit around second person 42. Widened width between first arm rest 28 and second arm rest 30 may be any size width for allowing first person 40 to spread his legs 44 wide enough to fit around second person 42. Widened width between first arm rest 28 and second arm rest 30 may vary depending on the size of first person 40 and/or second person 42.

Reduced length 52 may be included in second seat back 34. See FIG. 3. Reduced length 52 of second seat back 34 may be to position the top portion of the back of an individual seated in second chair 14 (i.e. second person 42) between the legs of an individual seated in first seat (i.e. the legs 44 of first person 40). Reduced length 52 may be any size length of second seat back 34 adapted to position the top portion of the back of second person 42 between the legs 44 of the first person 40. Reduced length 52 may vary depending on the size of first person 40 and/or second person 42. In one embodiment, reduced length 52 may be less than 25 inches. In another embodiment, reduced length 52 may be between 5 and 20 inches. In yet another embodiment, reduced length 52 may be approximately 12 inches.

First reclined angle 54 and second reclined angle 56 may optionally be included with first chair 12 and second chair 14, respectively. See FIGS. 3, 5, and 10. First chair 12 may be reclined from vertical at first reclined angle 54, and second chair 14 may be reclined from vertical at second reclined angle 56. First reclined angle 54 and second reclined angle 56 may be for providing comfort and stability in tiered inline loveseat 10 for first person 40 and/or second person 42. First reclined angle 54 and second reclined angle 56 may be any desired reclined angle or angles. In one embodiment, second reclined angle 56 may be greater than first reclined angle 54. In another embodiment, first reclined angle 54 may be between 10 and 50 degrees and second reclined angle 56 may be between 25 and 65 degrees. In another embodiment, first reclined angle 54 may be approximately 28 degrees and second reclined angle 56 may be approximately 45 degrees.

First seat angle 58 and second seat angle 60 may optionally be included with first chair 12 and second chair 14, respectively. See FIGS. 3, 5, and 10. First seat back 26 may be positioned from first seat 16 at first seat angle 58, and second seat back 34 may be positioned from second seat 32 at second angle 60. First seat angle 58 and second seat angle 60 may be for providing comfort and stability in tiered inline loveseat 10 for first person 40 and/or second person 42. First seat angle 58 and second seat angle 60 may be any desired seat angle or angles of first chair 12 and second chair 14. In one embodiment, first seat angle 58 and/or second seat angle 60 may be equal to or greater than 90 degrees. In another embodiment, first seat angle 58 and/or second seat angle 60 may be between 95 and 115 degrees. In yet another embodiment, first seat angle 58 and/or second seat angle 60 may be approximately 103 degrees.

Figure 10:
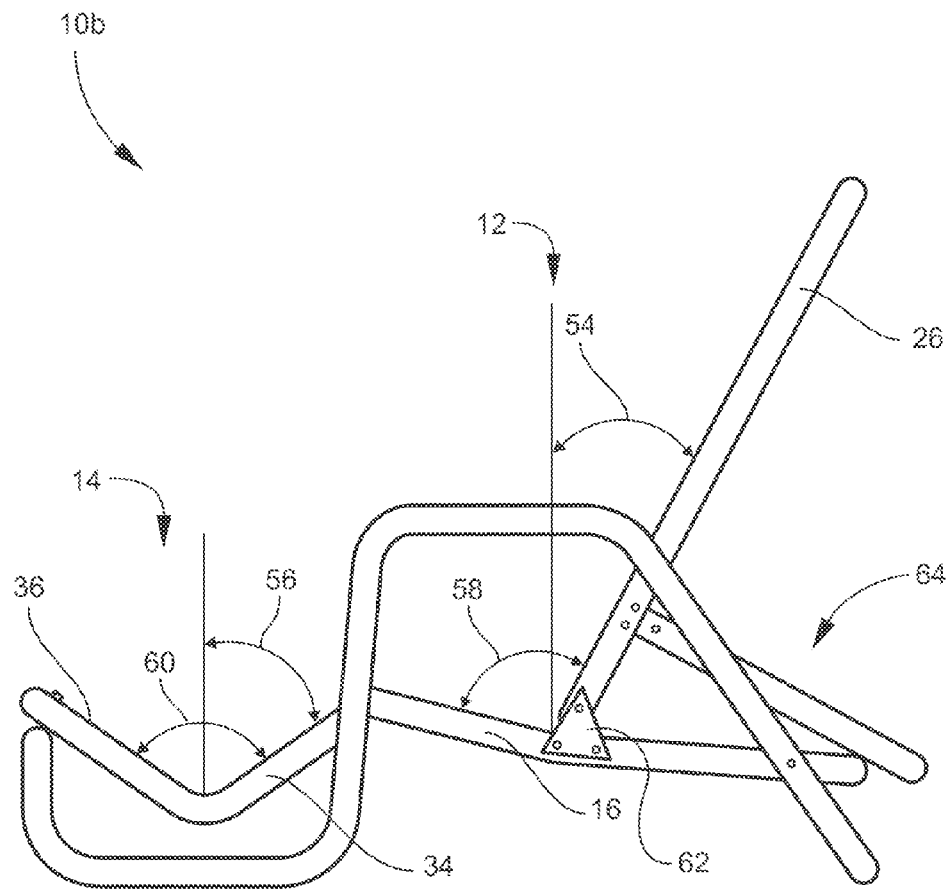
FIG. 10 is a side view of the embodiment of FIG. 9.
Figure 11:
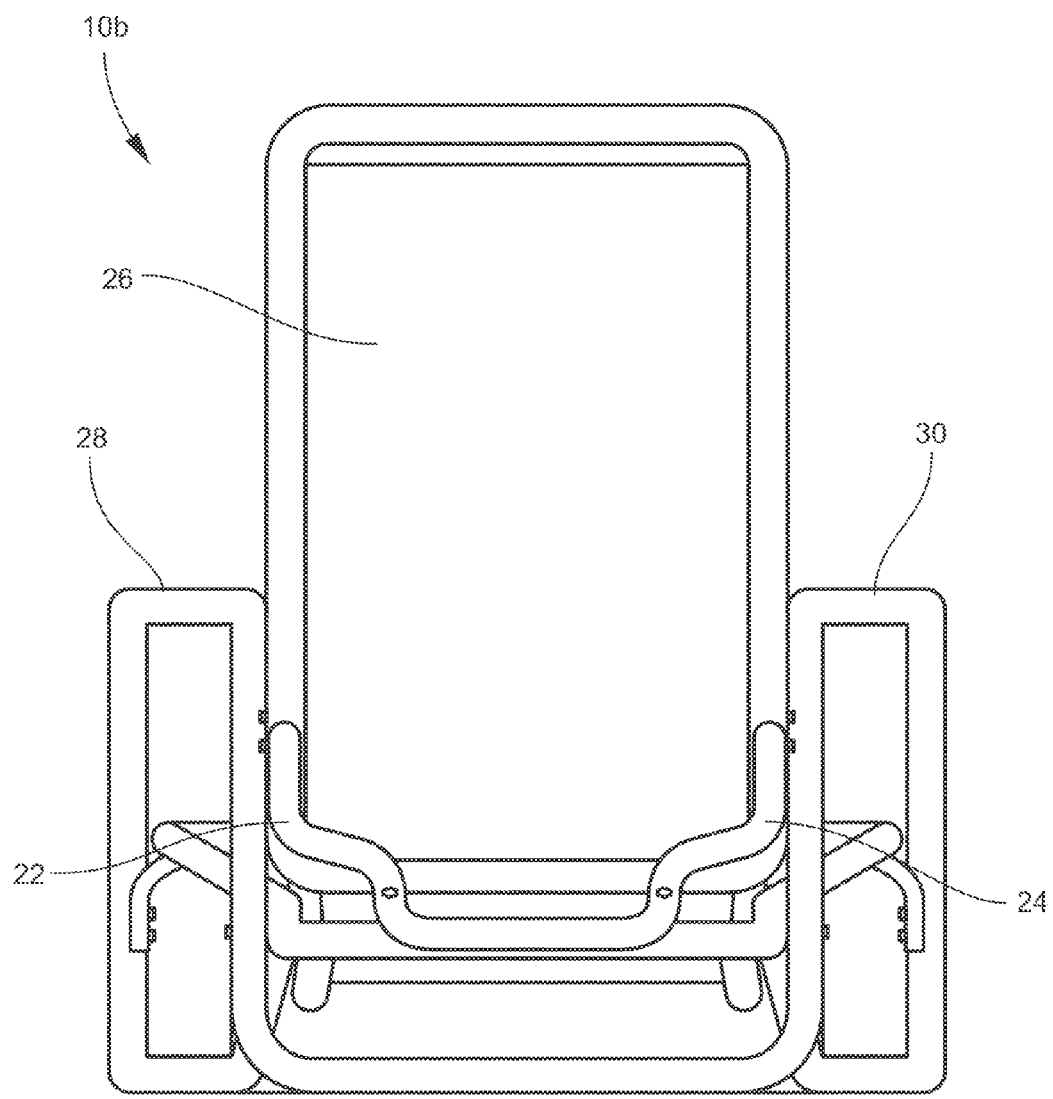
FIG. 11 is a back view of the embodiment of FIG. 9.
Figure 12:
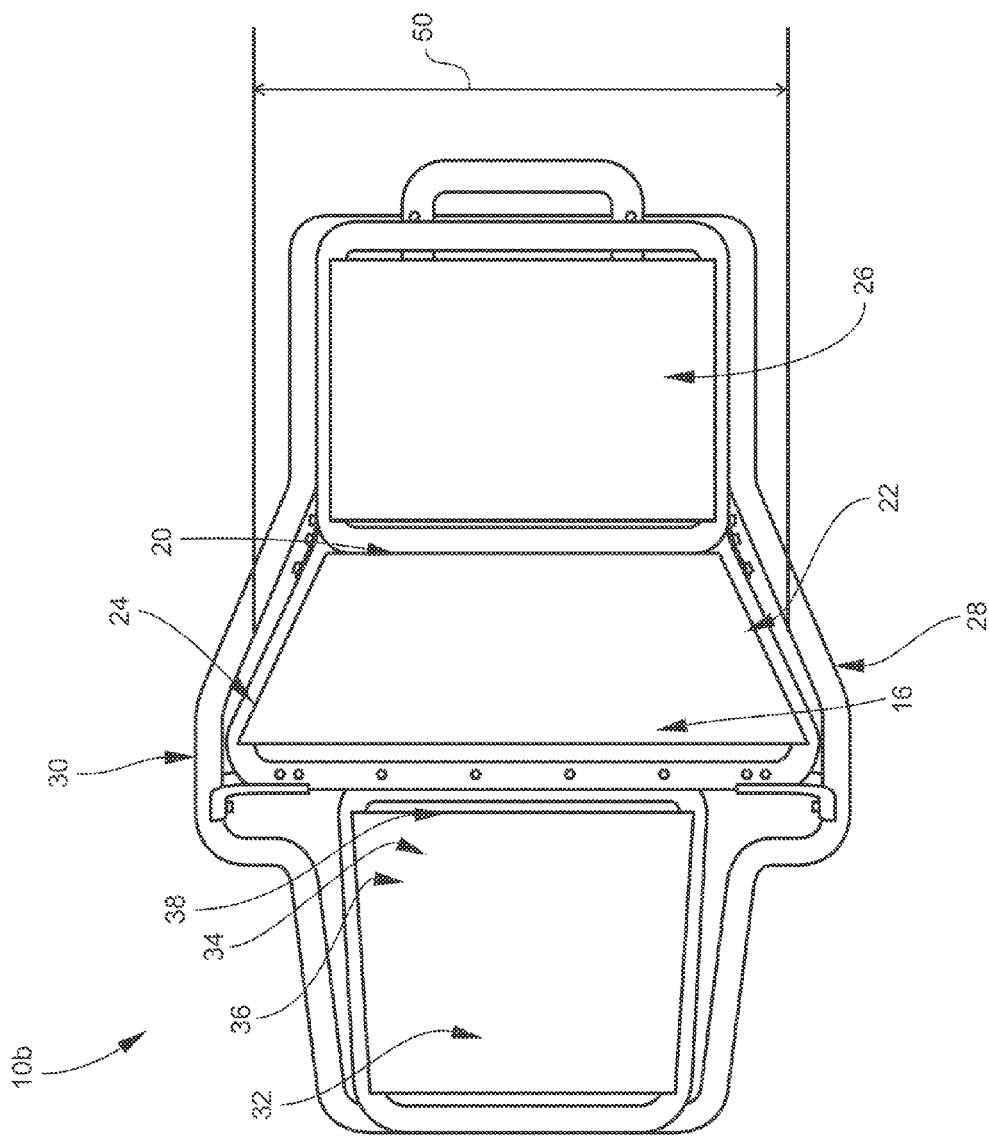
FIG. 12 is a top view of the embodiment of FIG. 9.
Figure 13:
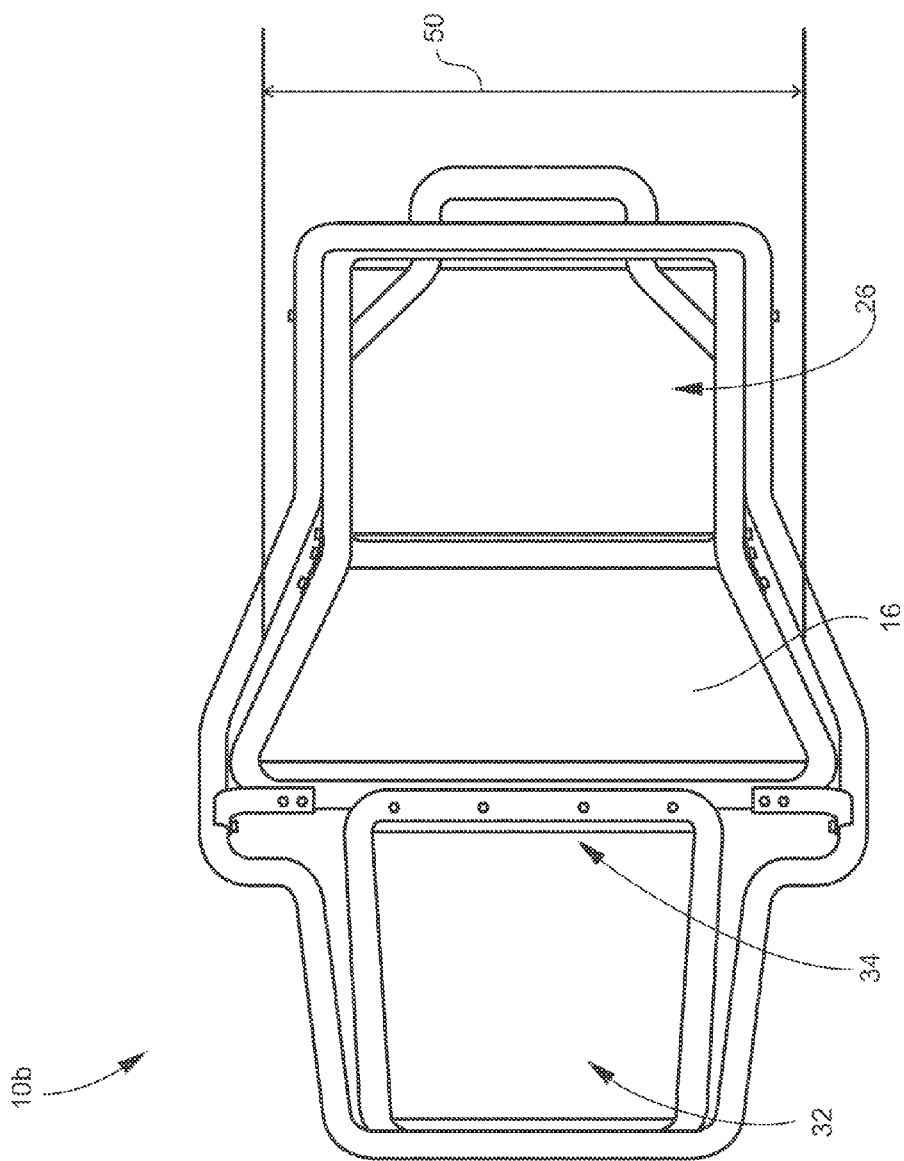
FIG. 13 is a bottom view of the embodiment of FIG. 9.

In one embodiment, first seat angle 58 may be adjustable. First seat angle 58 may be adjustable by any means and for any degree of adjustment. In one embodiment, first seat angle 58 may be adjustable from 90 degrees down to approximately 180 degrees or approximately flat. In one embodiment, as shown in FIG. 10, first chair 12 may include bracket 62 between first seat back 26 and first seat 16 that permits adjustment of the angle between first seat back 26 and first seat 16, along with an adjustable seat back 64. Adjustable seat back 64 may allow the user to select various angles for first seat angle 58 similar to pool lounge chairs. The most important characteristic of the disclosed tiered inline loveseat 10 may be that both parties be comfortable and/or receive pleasure from sitting, or reclining, in the loveseat. There may be a special relationship between the back seat angles and the front seat angles, in every variable situation. If the back seat angles are changed, the front seat angles may also need to be changed to maintain a comfortable situation. There may also be a tolerance in the size of the change of one of the variables before another has to be changed. Some elements might be changed and the rest could stay the same. For example, if the first seat back 26 is tilted almost to horizontal, the first seat 16 position may be changed, the second seat back 34 position may be changed, and the second seat 32 position may be changed in order to maintain the desired comfort level in tiered inline loveseat 10. A model incorporating adjustable characteristics such as these may have to be electric and may be an overstuffed version. This version may be ideal for watching TV or for just relaxing, or resting together. Beach models, motel balcony models, trail models may not be practicable to be adjustable.

Tiered inline loveseat 10 may be made of any desired materials. In one embodiment, as shown in FIGS. 1 and 2-8, tiered inline loveseat 10 may be made from wood. In another embodiment, as shown in FIGS. 9-14, tiered inline loveseat 10b may be made from a tubular frame, like aluminums, metals including, but not limited to, wrought iron, steel and any other desired metals like aluminum, brass, bronze, the like, etc., plastics, or other desired materials, with textile seats and seat backs, like canvas or mesh. However, the instant disclosure is not limited to the wooden embodiment shown in FIGS. 1 and 2-8 or to the tubular embodiment shown in FIGS. 9-14. In other embodiments, tiered inline loveseat 10 may be made from other standard furniture materials, like materials for indoor furniture, materials for indoor/outdoor furniture, materials for outdoor living furniture, materials for beach furniture, materials for camping furniture, stone furniture, natural furniture (carved into the earth), the like, and/or combinations thereof. These other materials may include, but are not limited to, stuffed fabric or overstuffed fabric (like for the TV or living room of a house), metals, including, but not limited to, wrought iron, steel, or any other desired metals like aluminum, brass, bronze, the like, etc., concrete (could be positioned on trails like mountain trails or other parks), stone or natural, plastic including plastic molds, the like, combinations thereof, or any other desired material for the creation of tiered inline loveseat 10.

Figure 14:
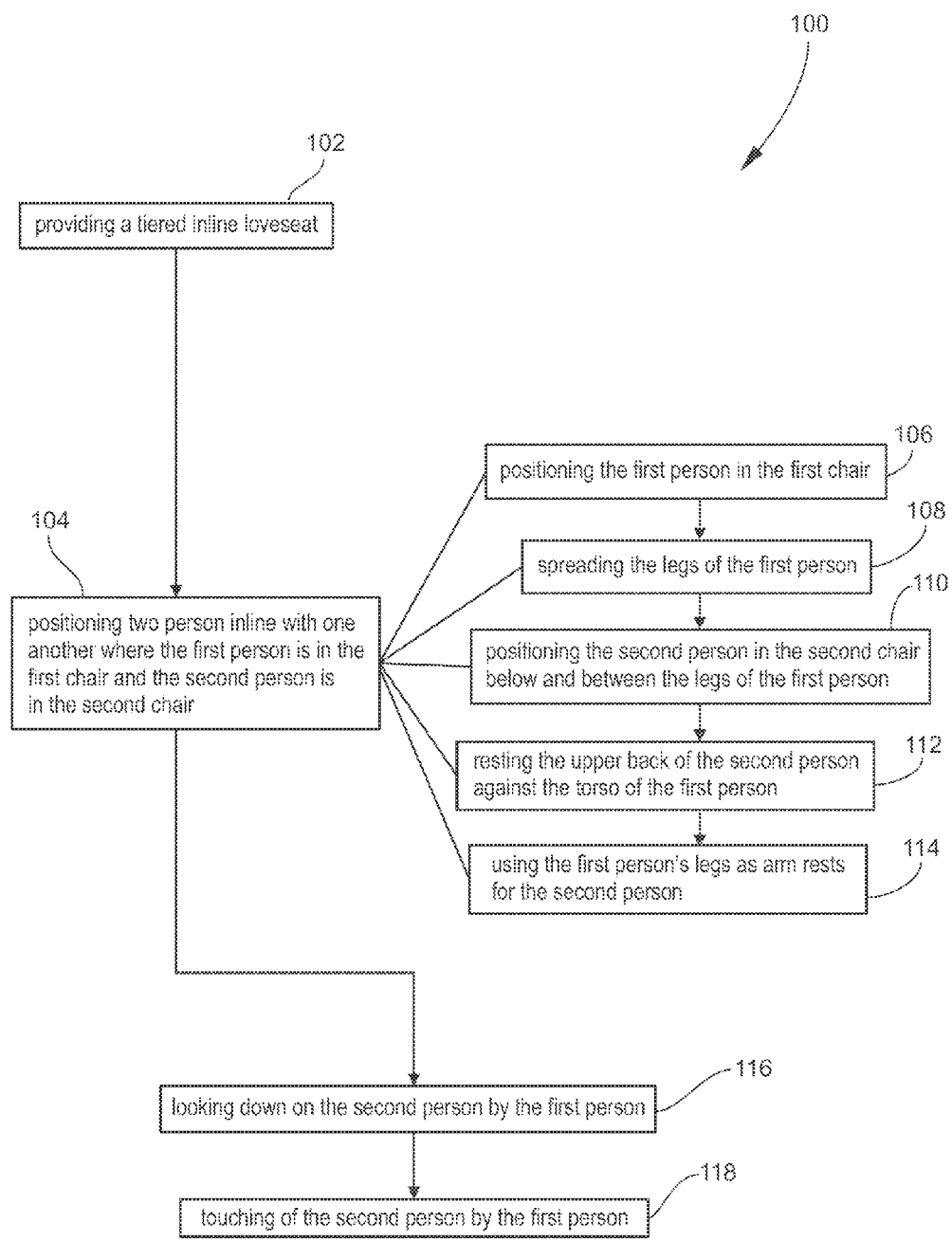
FIG. 14 is a flow chart depicting an exemplary embodiment of the method of intimacy.

Referring now to FIG. 14, in use, method of intimacy 100 may be conducted using various embodiments of tiered inline loveseat 10 as shown and described herein. Method of intimacy 100 may generally include the steps of: step 102 of providing tiered inline loveseat 10; and a step 104 of positioning two persons 40 and 42 inline with one another where first person 40 is in the first chair 12 and second person 42 is in second chair 14.

In one embodiment, step 104 of positioning two persons 40 and 42 inline with one another where first person 40 is in first chair 12 and second person 42 is in second chair 14 may further include the following steps: a step 106 of positioning first person 40 in first chair 12; a step 108 of spreading legs 44 of first person 40; a step 110 of positioning second person 42 in second chair 14 below and between legs 44 of first person 40; a step 112 of resting the upper back of second person 42 against torso 46 of first person 40; and a step 114 of using the legs 44 of first person 40 as arm rests for second person 42.

In another embodiment, the method 100 of intimacy may further include the steps of: a step 116 of looking down on second person 42 by first person 40; and/or a step 118 of touching of second person 42 by first person 40. Step 118 of touching of second person 42 by first person 40 may include merely touching of second person 42 by first person 40, or step 118 may include rubbing, massaging, etc. of second person 42 by first person 40.

The method 100 of intimacy by use of tiered inline loveseat 10 may be used for intimacy or sexual arousal, as it may be used so that the man sits behind and above the woman and his legs straddle her body. The woman can then use the man's legs as her arm rest and his chest or torso as her seat back. This orientation clearly differs from the conventional side-by-side loveseats. This orientation may permit the man to have a pleasurable view of his partner, as well as pleasurable physical contact. In addition, the woman may feel enveloped by the man as his legs straddle her and his torso is her seat back.

Many uses of tiered inline loveseat 10 could be desired. Tiered inline loveseat 10 could be an attraction to couples when placed along the seashore, at swimming pools, by views of natural beauty, at resting places on hiking trails, at stadiums, at swimming pools, in movie theatres, at sporting events, in auditoriums, in backyards, on patios, in front of TVs, etc. The orientation, function, purpose, and comfort of the tiered inline loveseat 10 with its wideness and angled structure can be implemented in many styles and materials such as Adirondack style, overstuffed, metals, including but not limited to, wrought iron, steel, or any other desired metals, like brass, bronze, the like, etc., concrete, plastic, metal tubing and mesh, as well as a folding model. In addition, tiered inline loveseat 10 may be designed to accommodate a wide range of heights and weights. Tiered inline loveseat 10 has been designed to allow both users to comfortably place their feet on the ground or floor where the tiered inline loveseat 10 has been placed.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

What is claimed is:

1. A tiered inline loveseat configured to position two persons inline with one another, where a second person is positioned in front of and below a first person, the second person is between the legs of the first person, the legs of the first person function as arm rests for the second person, and the torso of the first person functions as a seat back for the second person, wherein said tiered inline loveseat comprises:
   a first chair for the first person and a second chair for the second person, where the second chair is positioned in line and below the first chair, the first chair comprises:
      a first seat with a front end, a back end, a first side and a second side;
      a first seat back wherein the first seat back is coupled to the back end of the first seat; and
   the second chair comprises:
      a second seat; and
      a second seat back with a bottom edge and a top edge;
   wherein the top edge of the second seat back is coupled to the front end of the first seat;
   wherein said first seat has a reduced depth to position the second person between the legs of the first person;
   wherein said second seat back has a reduced length to position with said reduced depth of said first seat and with the top portion of the second person's back between the legs of the first person; and
   wherein the first chair is reclined from vertical at a first reclined angle, and the second chair is reclined from vertical at a second reclined angle, where the second reclined angle is greater than the first reclined angle.

2. The tiered inline loveseat of claim 1 further comprising:
   a first arm rest and a second arm rest, wherein the first arm rest is for the first side of the first seat and the second arm rest is for the second side of the first seat;
   wherein, the first arm rest is coupled to the first side of the first seat and the first seat back, and the second arm rest is coupled to the second side of the first seat and the first seat back.

3. The tiered inline loveseat of claim 1 wherein said reduced depth is less than 20 inches.

4. The tiered inline loveseat of claim 1 herein said reduced depth is between 5 and 15 inches.

5. The tiered inline loveseat of claim 1 wherein said reduced depth is approximately 11 inches.

6. The tiered inline loveseat of claim 1 wherein said first seat has a widened width to allow the first person to spread his legs wide enough to fit around the second person.

7. The tiered inline loveseat of claim 6 wherein said widened width of said first seat has an average width of greater than 15 inches.

8. The tiered inline loveseat of claim 6 wherein said widened width of said first seat has an average width of between 20 and 40 inches.

9. The tiered inline loveseat of claim 6 wherein said widened width of said first seat has an average width of approximately 29 inches.

10. The tiered inline loveseat of claim 1 wherein said reduced length of said second seat back is less than 25 inches.

11. The tiered inline loveseat of claim 1 wherein said reduced length of said second seat back is approximately 12 inches.

12. The tiered inline loveseat of claim 1 wherein said first seat back is positioned from said first seat at a first seat angle equal to or greater than 90 degrees, and said second seat back is positioned from said second seat at a second seat angle equal to or greater than 90 degrees.

13. The tiered inline loveseat of claim 12 wherein said first seat angle being adjustable.

* * * * *